United States Patent
Sax et al.

(10) Patent No.: US 6,529,140 B1
(45) Date of Patent: Mar. 4, 2003

(54) MAGNETIC BI-DIMENSIONAL POSITION SENSOR

(75) Inventors: Herbert Sax, Grosskarolinenfeld (DE); Bruno Murari, Monza (IT); Flavio Villa, Milan (IT); Benedetto Vigna, Potenza (IT); Paolo Ferrari, Gallarate (IT)

(73) Assignee: STMIcroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/085,887

(22) Filed: May 27, 1998

(30) Foreign Application Priority Data

May 28, 1997 (IT) .......................................... TO97A0452

(51) Int. Cl.⁷ ............................................... G08C 19/06
(52) U.S. Cl. ............................. 340/870.33; 324/204.23; 701/41
(58) Field of Search .................. 340/870.33; 324/207.2, 324/207.21, 207.11, 207.23; 701/41

(56) References Cited

U.S. PATENT DOCUMENTS

| | | | |
|---|---|---|---|
| 3,697,761 A | 10/1972 | Kamachi | 250/222 R |
| 4,458,226 A | 7/1984 | Cho | 335/205 |
| 4,459,578 A | 7/1984 | Sava et al. | 338/128 |
| 4,500,867 A | 2/1985 | Ishitobi et al. | 338/128 |
| 4,574,286 A | 3/1986 | Andresen | 340/870.31 |
| 4,622,644 A | 11/1986 | Hansen | 702/153 |
| 5,073,711 A | 12/1991 | Brininstool et al. | 250/231.18 |
| 5,450,054 A | 9/1995 | Schmersal | 338/128 |
| 5,501,110 A | 3/1996 | Peilloud et al. | 324/207.2 |
| 5,525,901 A | 6/1996 | Clymer et al. | 324/207.2 |
| 5,530,345 A | 6/1996 | Murari et al. | |
| 5,825,178 A | 10/1998 | Hipp et al. | 324/207.2 |
| 6,153,875 A | 11/2000 | Villa et al. | 250/208.2 |

FOREIGN PATENT DOCUMENTS

| | | | |
|---|---|---|---|
| DE | 3405 688 A1 | 8/1985 | A63F/9/22 |
| EP | 0 501 906 A1 | 2/1992 | G05K/11/18 |
| EP | 0 358 320 | 12/1994 | |
| EP | 0 881 468 | 2/1998 | |
| GB | 2 197 483 A * | 5/1988 | |
| GB | 2 254 690 A | 10/1992 | G05G/9/047 |
| WO | WO 91/20022 | 12/1991 | G05G/9/047 |

\* cited by examiner

Primary Examiner—Timothy Edwards, Jr.
(74) Attorney, Agent, or Firm—Lisa K. Jorgenson; Harold H. Bennett, II; Seed IP Law Group PLLC (57) ABSTRACT

A bi-dimensional position sensor that can be advantageously used in the turn system controlled from the steering wheel of a vehicle. The sensor includes a permanent magnet fixed to a control lever so as to move in a plane along first and second directions and to rotate about a third direction orthogonal to the preceding ones. The permanent magnet is movable with respect to an integrated device including a first group of sensor elements arranged spaced along the first direction, a second group of sensor elements arranged spaced along the second direction and a third group of sensor elements detecting the angular position of the permanent magnet. Electronics integrated with the sensor elements generate a code associated with each position which the permanent magnet may assume and generate a control signal corresponding to the desired function.

34 Claims, 4 Drawing Sheets

|   | $10_1$ | $10_2$ | $10_3$ | $10_4$ | $10_5$ | $10_6$ | $10_7$ | $10_8$ | $10_9$ |
|---|---|---|---|---|---|---|---|---|---|
| A | 1 | 0 | 0 | 1 | 1 | 1 | 1 | 1 | 0 |
| B | 1 | 1 | 0 | 1 | 1 | 1 | 1 | 1 | 0 |
| C | 1 | 1 | 1 | 1 | 1 | 1 | 1 | 1 | 0 |
| D | 1 | 0 | 0 | 0 | 1 | 1 | 1 | 1 | 0 |
| E | 1 | 1 | 0 | 0 | 1 | 1 | 1 | 1 | 0 |
| F | 1 | 1 | 1 | 0 | 1 | 1 | 1 | 1 | 0 |
| G | 1 | 0 | 0 | 0 | 0 | 1 | 1 | 1 | 0 |
| H | 1 | 1 | 0 | 0 | 0 | 1 | 1 | 1 | 0 |
| I | 1 | 1 | 1 | 1 | 1 | 1 | 1 | 1 | 0 |
| L | 1 | 0 | 0 | 0 | 0 | 0 | 1 | 1 | 0 |
| M | 1 | 1 | 0 | 0 | 0 | 0 | 1 | 1 | 0 |
| N | 1 | 1 | 1 | 0 | 0 | 0 | 1 | 1 | 0 |

*FIG. 8*

|   | $10_1$ | $10_2$ | $10_3$ | $10_4$ | $10_5$ | $10_6$ | $10_7$ | $10_8$ | $10_9$ |
|---|---|---|---|---|---|---|---|---|---|
| A | 0 | 0 | 0 | 0 | 0 | 1 | 1 | 1 | 1 |
| B | 0 | 0 | 0 | 0 | 1 | 1 | 1 | 1 | 1 |
| C | 0 | 0 | 0 | 1 | 1 | 1 | 1 | 1 | 1 |
| D | 1 | 1 | 0 | 0 | 0 | 0 | 1 | 1 | 1 |
| E | 0 | 1 | 1 | 0 | 0 | 1 | 1 | 1 | 1 |
| F | 0 | 0 | 1 | 1 | 1 | 1 | 1 | 1 | 1 |
| G | 1 | 1 | 1 | 0 | 0 | 0 | 0 | 1 | 1 |
| H | 1 | 1 | 1 | 1 | 0 | 0 | 1 | 1 | 1 |
| I | 0 | 1 | 1 | 1 | 1 | 1 | 1 | 1 | 1 |
| L | 1 | 1 | 1 | 1 | 0 | 0 | 0 | 1 | 1 |
| M | 1 | 1 | 1 | 1 | 1 | 0 | 0 | 1 | 1 |
| N | 1 | 1 | 1 | 1 | 1 | 1 | 1 | 1 | 1 |

*FIG. 9*

MAGNETIC BI-DIMENSIONAL POSITION SENSOR

TECHNICAL FIELD

The present invention relates to a bi-dimensional position sensor of magnetic type, particularly for motor vehicle applications.

BACKGROUND OF THE INVENTION

As is known, at the present time the auxiliary functions controlled on the steering wheel (turn systems) of a motor vehicle, such as switching on the parking lights, full beam, dipped headlights, and direction indication, are performed by means of mechanical sliding contacts, the manufacture of which is particularly burdensome and affected by problems associated with the contacts (wear, aging etc.).

Control systems for these functions which do not require mechanical sliding contacts are therefore desirable.

In general, this problem is also encountered in applications which provide for the sending of a plurality of commands or signals by movement of a control element which acts on sliding contacts and in which there are a large number of operations of the control element.

SUMMARY OF THE INVENTION

According to principles of the present invention, a magnetic bi-dimensional position sensor is provided which includes a magnetic field generator having alternate areas of a first magnetic direction and a second magnetic direction. The magnetic field generator is translatable in a plane along first and second directions and is rotatable around an axis orthogonal to the first and second directions. The magnetic field generator may be a permanent magnet having quadrants with alternately north and south magnetic field directions. The magnetic field is detected by a plurality of magnetic field sensitive elements, which may be Hall effect sensors or magneto-resistors. The magnetic field generator may be fixed to a lever in a motor vehicle.

DETAILED DESCRIPTION OF THE INVENTION

As shown in FIGS. 1–5, a sensor 1 according to several embodiments of the invention comprises an integrated device 2 and a permanent magnet 3 with four quadrants which is movable with respect to the integrated device 2, parallel to it (in proximity or in contact) so as to move along a plane defined by two different coordinates X and Y and to rotate about an axis Ω perpendicular to the plane XY. In its turn the integrated device 2 is formed by a plurality of sensor elements 10 sensitive to a magnetic field and by a coding system.

In an embodiment of the invention, shown in FIG. 2 and described below, the sensor elements 10 are formed by Hall effect sensors. Alternatively, as shown diagrammatically in FIG. 5, the sensor elements 10 may be magneto-resistors produced by means of special magnetic films (such as Co—Fe, Ni—Fe, Ni—Co) having the property of variable resistance as a function of the magnetic field in which they are placed (see for example R A McCurrie "Ferromagnetic Materials: Structure and Properties", Academic Press, vol. 2, page 93). The magneto-resistors have the advantage of being more sensitive to the magnetic field than Hall effect sensors, but require the deposition on the silicon, by sputtering or by evaporation, of magnetic films not generally used in the microelectronics industry and so they are more expensive to produce.

Figure 1:
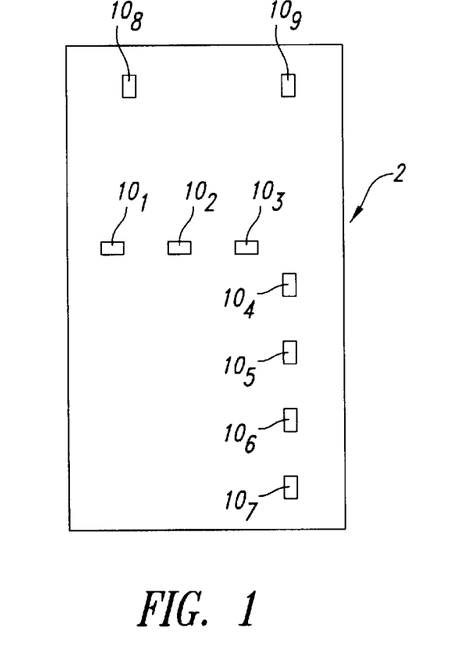
FIG. 1 shows an arrangement of sensor elements on a component of a sensor in diagrammatic form according to an embodiment of the present invention.

FIG. 1 shows a possible arrangement of the sensor elements 10 for the detection of 3×4 positions of the permanent magnet 3 in the plane XY and of the rotation by ±45° about the axis Ω (or, overall, of three different angular positions of the magnet 3). As will be noted, three sensor elements $10_1$–$10_3$ are spaced along a first direction (direction X), four sensor elements $10_4$–$10_7$ are spaced along a second direction (direction Y) perpendicular to the first direction X and two further sensor elements 108 and $10_9$ are present arranged at a distance from the sensor elements $10_1$–$10_7$ to detect an angle of rotation.

In general, therefore, to detect M positions along the direction X and N positions along the direction Y, at least M+N sensor elements are required, whilst two sensor elements serve to detect rotation in the case of rotations of ±45° and four sensor elements in the case of rotations of ±30° with respect to a nominal zero-angle position.

Figure 2:
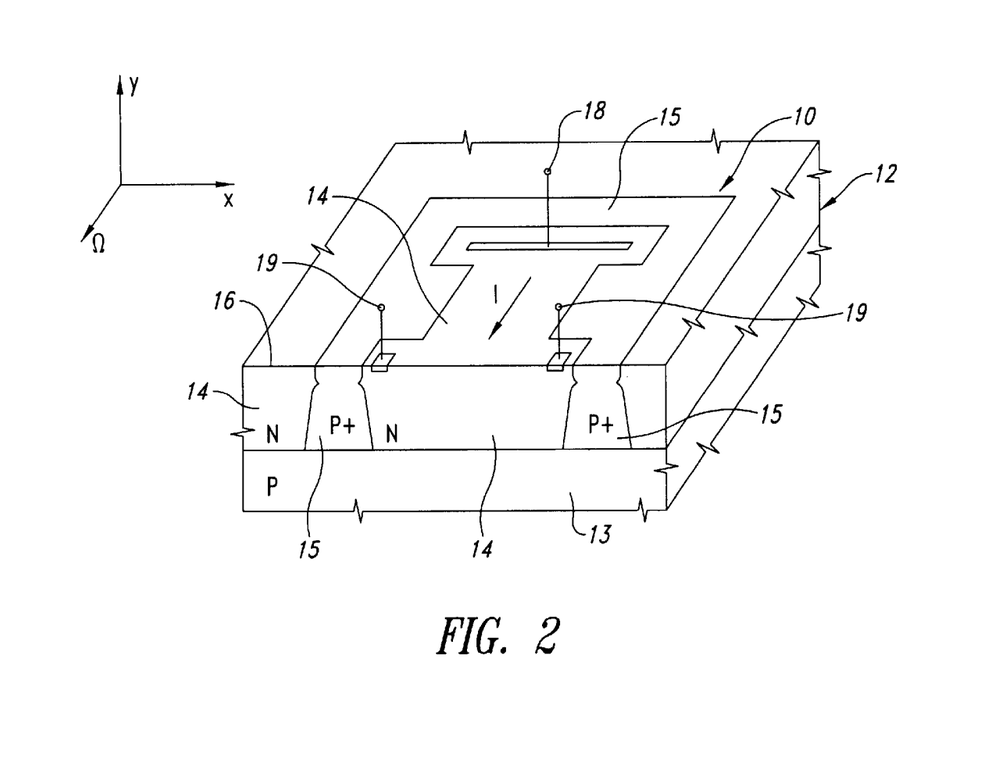
FIG. 2 shows a transverse section through part of the component shown in FIG. 1 according to an embodiment of the present invention.

FIG. 2 shows a transverse section of a portion of a silicon slice 12 in which the integrated device 2 is integrated, in correspondence with a Hall effect sensor element 10. In detail, the silicon slice 12 comprises a P-type substrate 13, an N-type epitaxial layer 14 and P$^+$-type junction insulation regions 15, extending from a surface 16 of the slice 12 to the substrate 13 and surrounding each sensor element 10. A contact region 18 can be seen on the surface 16 of the slice 12, which region, together with a similar contact region which is not shown, is used to supply a current I, whilst contact regions 19, also on the surface 16, enable a potential difference generated by the sensor element 10 to be detected. A more complex version of the sensor element 10 which can be advantageously used in the sensor 1 is also described in U.S. Pat. No. 5,530,345 which is incorporated herein by reference.

Figure 3:
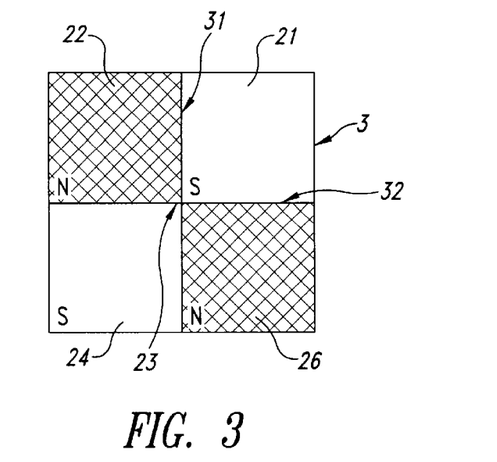
FIG. 3 shows a second component of the sensor shown in FIG. 1 according to an embodiment of the present invention.
Figure 4:
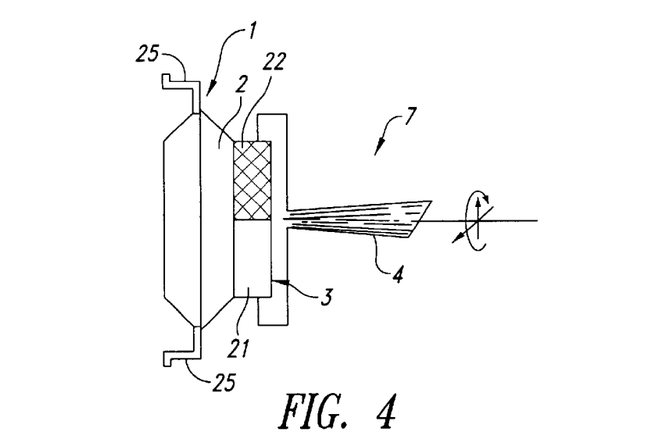
FIG. 4 shows a side view of a control device using the sensor shown in FIG. 1 according to an embodiment of the present invention.

As shown in a front view in FIG. 3 according to another embodiment of the invention, the permanent magnet 3 has four quadrants, alternately polarized South (quadrants 21 and 23) and North (quadrants 22 and 26), defining a center 24 and of dimensions such that, according to the position assumed by the permanent magnet 3 with respect to the integrated device 2, each of the sensor elements 10 sees a specific quadrant 21, 22, 23, or 26 and generates a voltage of corresponding value (positive in the case of the North quadrants 22 and 26 and negative in the case of the South quadrants 21 and 23, for example). As shown in FIG. 4 according to another embodiment of the invention, the sensor 1 may be fitted to a control element, in this case a lever 4, so as to define together therewith a control device 7 which can be controlled manually or by a machine and outputs an electrical control signal which can be used by an actuator. In particular, the permanent magnet 3 is fixed integrally with the lever 4 so as to follow its movements of translation according to the axes X and Y and of rotation about the axis Ω. According to this embodiment of the invention, the lever 4 is produced as a common control lever for a multifunctional switch system, fixed to a steering wheel of a motor vehicle with a joint (not shown) forming a turn system such as to transform the operations of the lever 4 on the driver's part into the rotational and translational movements provided for the permanent magnet 3. In particular, a guide mechanism (not shown) permits only discrete movements of the permanent magnet 3 with respect to the integrated device 2, as described in greater detail below with reference to FIGS. 6 and 7.

Figure 5:
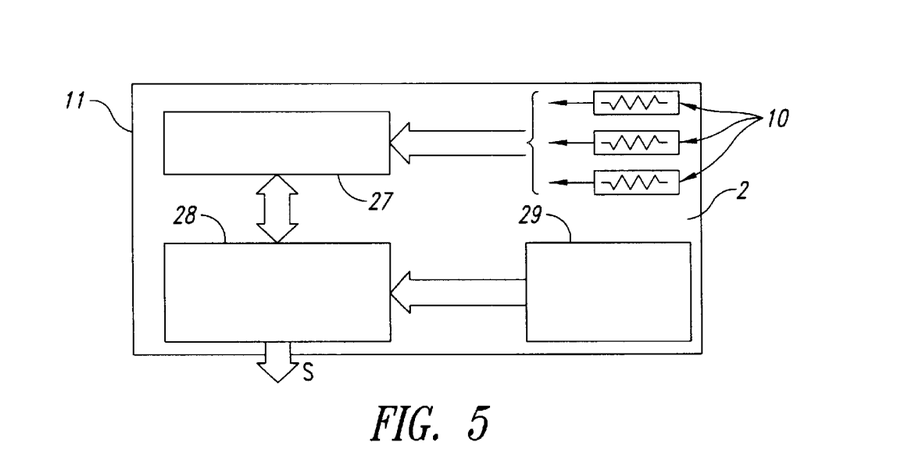
FIG. 5 shows a block diagram of a component of the sensor shown in FIG. 1 according to an embodiment of the present invention.

As shown in FIG. 5 according to another embodiment of the invention, the voltages generated by the sensor elements 10 are supplied to a coding system 11 comprising a code generator block 27, a processing unit 28 and a memory 29 which stores an association between each code which can be generated by the generator block 27 and a respective control.

In particular, the code generator block 27 receives analog voltages generated by each sensor element 10 and transforms them into a digital code of several bits, generating, for example, a logic "1" when it receives a positive voltage (the sensor element 10 detects proximity to a North quadrant 22 or 26 of the permanent magnet) and a logic "0" in the opposite case. In practice, the code generator block 27 may be constituted by a battery of comparators each having an input connected to ground and an input receiving the voltage generated by a respective sensor element 10. The binary code thus obtained (which has nine bits in the case of the integrated device 2 with nine sensor elements 10 shown in FIG. 1) is supplied to the processing unit 28 which, on the basis of the code received and the code stored in the memory 29, determines the corresponding control (switching on parking lights, full beam or dipped headlights or another control) and generates an output signal S supplied, via the pins 25 of the integrated device 2 shown in FIG. 4, to the relative actuator (not shown) and/or to a central unit of the vehicle (not shown) to be processed.

Obviously, to distinguish the various positions of the permanent magnet 3 with respect to the integrated device 2 it is necessary that each position which the permanent magnet 3 can assume has an unambiguous code which does not coincide with that of any other position or that, in each position, at least one of the sensor elements 10 detects an opposite quadrant with respect to all the other positions. In particular, as regards translation, this requires, for each translation of the permanent magnet 3, that the center 24 of the permanent magnet 3 is brought to a different side of at least one of the seven sensor elements $10_1$–$10_7$; in the case of the sensor elements $10_1$–$10_9$ of FIG. 1, the center 24 of the permanent magnet 3 may therefore roughly assume one of the positions shown in FIG. 6 and identified by the letters A–N according to another embodiment of the invention.

Figure 6:
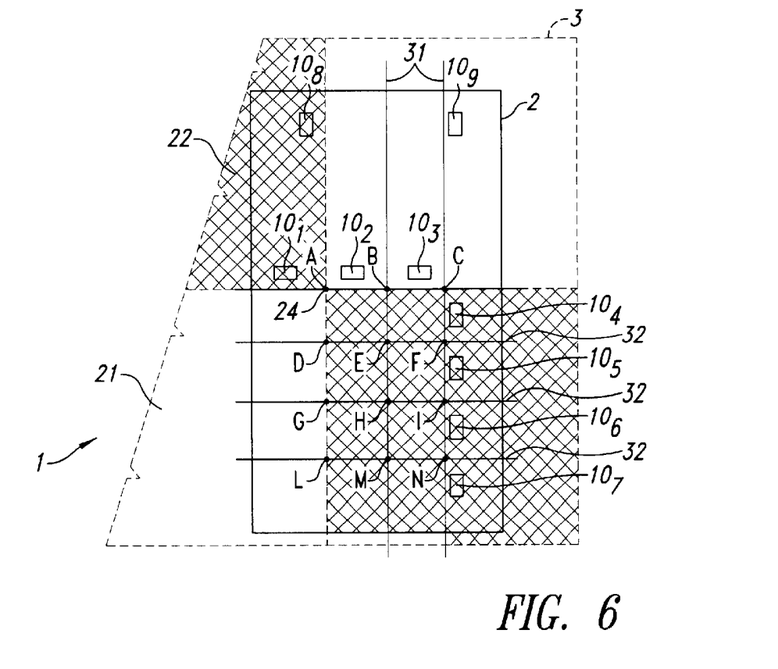
FIGS. 6 and 7 show two diagrams of cooperation between components of the sensor shown in FIG. 1 in diagrammatic form according to other embodiments of the invention.
Figure 8:
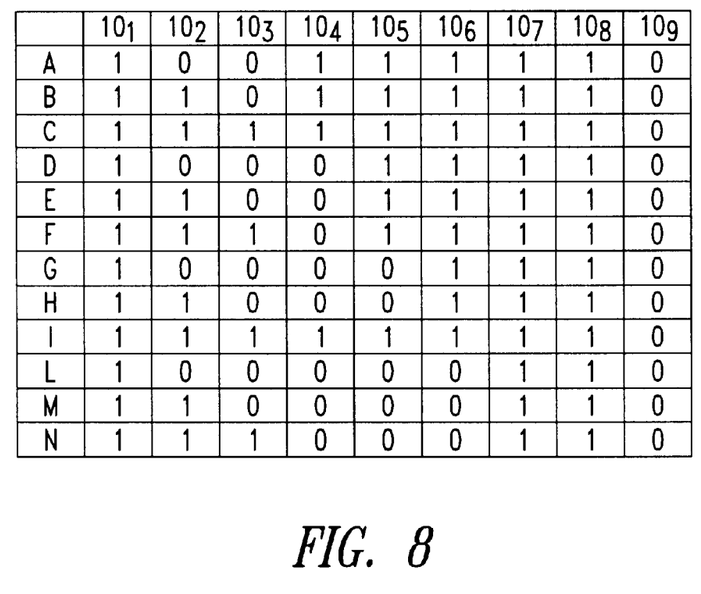
FIGS. 8 and 9 show tables relating to codes obtainable for different relative positions of the components of the sensor shown in FIG. 1 according to other embodiments of the invention.

In particular, in FIG. 6, the horizontal and vertical lines are aligned, in each position A–N, with separation lines, denoted by 31, 32, of the quadrants of the permanent magnet 3 and the permanent magnet 3 has been shown in the position centered on position A; consequently, movements of the permanent magnet 3 with respect to the integrated device 2 such as to bring its center 24 into correspondence with the positions A–N cause the generation of respective codes, as shown in the table of FIG. 8 for example and according to another embodiment of the invention.

As will be noted, the sensor elements $10_8$ and $10_9$ are unchanging for every translation in the plane XY and assume differing values.

Figure 7:
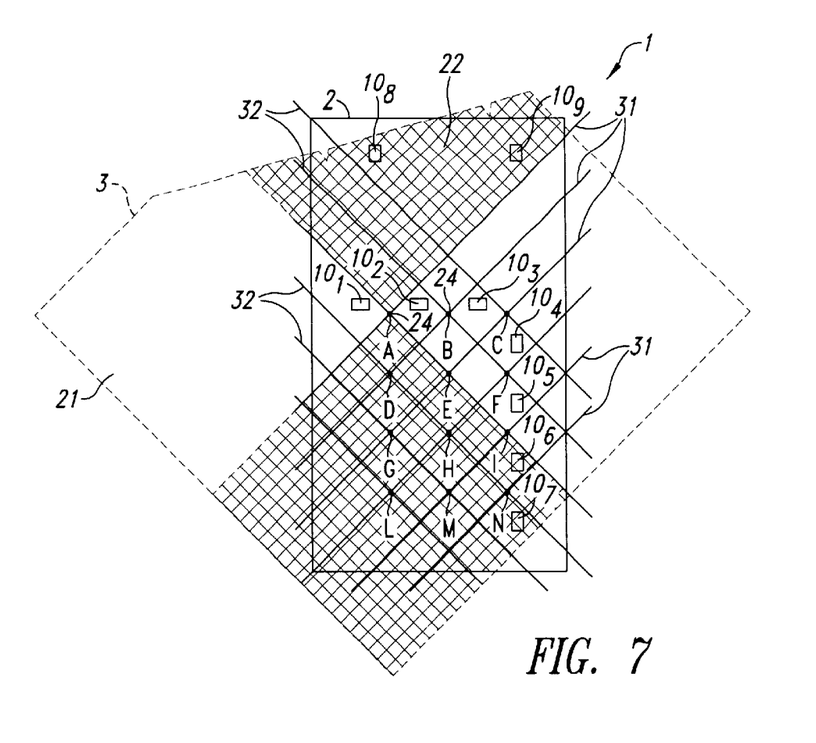

Similarly, FIG. 7 shows according to another embodiment of the invention, the position of the permanent magnet 3 with respect to the integrated device 2 when the permanent magnet 3 is centered on position A and rotated by 45° clockwise with respect to the position shown in FIG. 6. Also shown are the separation lines 31, 32 of the quadrants 21, 22, 23 and 26 of the permanent magnet 3 in the different positions A–N of the center 24; as will be noted, these separation lines 31, 32 are now inclined by ±45°. In this case, therefore, the code shown in the table of FIG. 9 is obtained according to another embodiment of the invention.

As will be noted, the sensor elements $10_8$ and $10_9$ are always associated with a logic "1".

Figure 9:
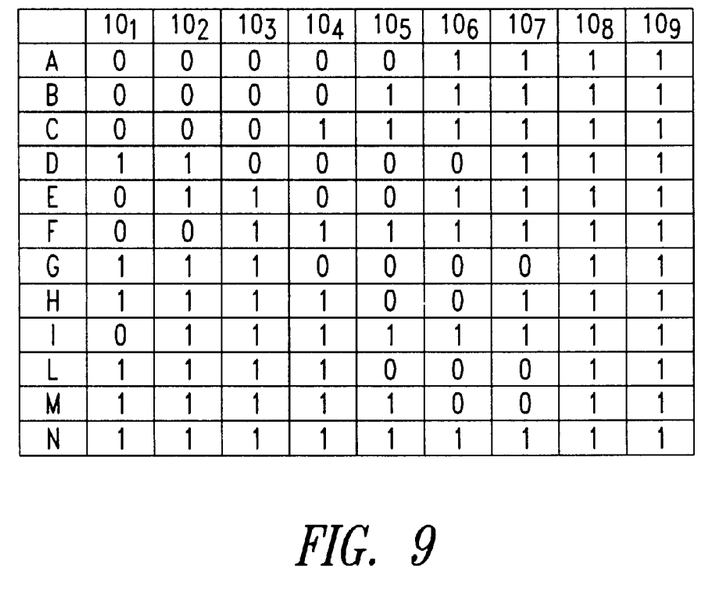

In a manner not shown, in view of the symmetry of the system a rotation of the permanent magnet 3 in the direction opposite to that shown in FIG. 7 (i.e., 45° anticlockwise with respect to FIG. 6) provides a table complementary to that of FIG. 9.

The sensor 1 described has the following advantages. Primarily it is inexpensive, associated with the manufacturing costs of integrated devices; it is also highly reliable and durable, given that it does not comprise the use of sliding contacts and the permanent magnet 3 may also be at a slight distance from the integrated device 2. Furthermore, it enables the number of controls that can be implemented to be extended with ease and it is not affected by surrounding light conditions.

Finally it will be clear that modifications and variants can be introduced to the sensor described and illustrated here without thereby departing from the protective scope of the invention, as defined in the accompanying claims. In particular, it is emphasized that the electronics for processing the signals generated by the sensor elements 10, or at least part of them, could also not be integrated with the said sensor elements 10 were this to be desirable or appropriate for specific applications.

From the foregoing it will be appreciated that, although specific embodiments of the invention have been described herein for purposes of illustration, various modifications may be made without deviating from the spirit and scope of the invention. Accordingly, the invention is not limited except as be the appended claims.

What is claimed is:

1. A bi-dimensional position sensor comprising:
   a permanent magnet facing and movable with respect to a plurality of elements sensitive to a magnetic field, the permanent magnet being movable in a plane along a first direction and a second direction which are not coincident and being rotatable about a third direction orthogonal to the first and second directions, the plurality of elements sensitive to a magnetic field comprising a first group of sensitive elements arranged spaced along the first direction, a second group of sensitive elements arranged spaced along the second direction and a third group of sensitive elements detecting an angular position of the permanent magnet.

2. A bi-dimensional position sensor according to claim 1 wherein the sensitive elements comprise integrated Hall effect sensors.

3. A bi-dimensional position sensor according to claim 1 wherein the sensitive elements comprise magneto-resistors.

4. A bi-dimensional position sensor according to claim 1 wherein the permanent magnet has four quadrants.

5. A bi-dimensional position sensor according to claim 1 wherein the sensitive elements are integrated in an integrated device, the integrated device also comprising a code generating unit, a code memory and a processing unit, the code generating unit being connected to the sensitive elements and being structured to generate a digital code correlated to a plurality of output voltages generated, respectively, by the sensitive elements, the code memory being structured to store a correspondence between a plurality of codes and a respective plurality of controls, and the processing unit being connected to the code generating unit and the code memory and being structured for generating control signals corresponding to digital codes received from the code generating unit according to the stored correspondence.

6. A control device comprising:
a control member structured to be displaced into a plurality of different positions along first and second axes;
a magnetic field generator fixed to the control member, the magnetic field generator having first areas with a first magnetic direction and second areas with a second magnetic direction; and
an integrated electronic device having a plurality of magnetic field detectors structured to detect the magnetic field from the magnetic field generator, the electronic device being structured to generate one or more control signals based on the one of the plurality of different positions occupied by the control member, as determined by the position of the magnetic field generator indicated by its magnetic field.

7. A control device according to claim 6 wherein the control member comprises a control lever for a multifunctional switch system coupled to a steering wheel in a motor vehicle.

8. A control device according to claim 6 wherein the magnetic field generator comprises a permanent magnet having a plurality of sections, the sections being alternately polarized in a north direction and a south direction.

9. A control device according to claim 6 wherein the detectors comprise Hall effect sensors.

10. A control device according to claim 6 wherein the detectors comprise magneto-resistors.

11. A control device according to claim 6 wherein the electronic device further comprises:
a code generator circuit coupled to receive a voltage from each of the detectors and structured to generate a code based on the voltages received from the detectors;
a memory circuit structured to store a plurality of codes and associated commands, each stored code corresponding to a position of the control member; and
a processing circuit coupled to the code generator circuit to receive the code and coupled to the memory circuit to access the codes and the associated commands stored in the memory circuit, the processing circuit being structured to compare the code received from the code generator circuit with the codes stored in the memory circuit and to select a command stored in the memory circuit based on the comparison, the processing circuit being structured to generate a control signal based on the command and to provide the control signal to a system external to the control device.

12. An apparatus, comprising:
a first plurality of sensors distributed along a first line in a first plane;
a second plurality of sensors distributed along a second line, perpendicular to the first line, in the first plane; and
a control member structured to be displaced into a plurality of positions along a first and second axes;
a magnet fixed to the control member facing the first plane and being movable into a plurality of different position along a first and a second axes.

13. The apparatus of claim 12 wherein the first and second pluralities of sensors are configured to detect the position of the magnet in the second plane with respect to the second and first lines respectively.

14. The apparatus of claim 12 wherein the first and second pluralities of sensors are integrated into a single device.

15. The apparatus of claim 12 wherein the magnet is mechanically coupled to a lever mounted to an automobile.

16. The apparatus of claim 12 wherein the magnet is rotatable on an axis orthogonal to the first and second planes.

17. The apparatus of claim 16, further including a third plurality of sensors distributed in the first plane and configured to detect an angle of rotation of the magnet.

18. The apparatus of claim 17 the first, second and third pluralities of sensors are integrated into a single device.

19. The apparatus of claim 17 wherein the magnet presents a first face to the first an wherein the first face of the magnet includes alternating quadrants of north and south magnetic polarizations.

20. The apparatus of claim 19 wherein the first, second and third pluralities of sensors are configured to detect the position and angle of rotation of the magnet in the second plane based upon the presence of a north or south polarized portion of the magnet opposite each respective sensor of the first, second and third pluralities of sensors.

21. The apparatus of claim 20 further including circuitry configured to receive data from the first, second and third pluralities of sensors and convert the data to a plurality of control signals.

22. The apparatus of claim 21 wherein the plurality of control signals are electrically coupled and configured to control a plurality of auxiliary functions of an automobile.

23. A device, comprising:
of sensors distributed in a first plane;
a magnet facing the first plane and movable to a plurality of positions along first and second axes in a second plane parallel to the first plane; and
a circuit integrated with the plurality of sensors in a single unit and configured to receive data from the plurality of sensors and produce a signal at an output based upon the position of the magnet in the second plane with respect to the plurality of sensors in the first plane.

24. The device of claim 23 wherein the output comprises a plurality of terminals and the signal comprises a voltage level at each of the plurality of terminals.

25. A method, comprising:
moving a magnet to a position along first and second axes in a first plane, the magnet including alternating regions of north and south magnetic polarization on a face thereof;
sensing the polarity of a portion of the face of the magnet opposite a plurality of sensors on a second plane parallel to the first plane; and
locating the position of the magnet in the second plane based on the polarities of the portions of the face of the magnet opposite each of the plurality of sensors.

26. The method of claim 25 further including:
   rotating the magnet on an axis perpendicular to the first plane; and
   interpreting the angle of rotation of the magnet based on the polarities of the portions of the face of the magnet opposite each of the plurality of sensors.

27. The method of claim 26 further including controlling a plurality of functions ba upon the position and angle of rotation of the magnet.

28. The method of claim 27 wherein each of the plurality of functions is an auxiliary function of an automobile.

29. The method of claim 27 wherein the step of moving the magnet includes moving a lever, and wherein the lever is mechanically coupled to the magnet.

30. A bi-dimensional position sensor comprising:
   a permanent magnet facing and movable with respect to a plurality of elements sensitive to a magnetic field, the permanent magnet being movable in a plane along a first direction and a second direction which are not coincident and being rotatable about a third direction orthogonal to the first and second directions, the plurality of elements sensitive to a magnetic field comprising a first group of sensitive elements arranged spaced along the first direction, a second group of sensitive elements arranged spaced along the second direction and a third group of sensitive elements detecting an angular position of the permanent magnet; and
   wherein the sensitive elements are integrated in an integrated device, the integrated device also comprising a code generating unit, a code memory and a processing unit, the code generating unit being connected to the sensitive elements and being structured to generate a digital code correlated to a plurality of output voltages generated, respectively, by the sensitive elements, the code memory being structured to store a correspondence between a plurality of codes and a respective plurality of controls, and the processing unit being connected to the code generating unit and the code memory and being structured for generating control signals corresponding to digital codes received from the code generating unit according to the stored correspondence.

31. A control device comprising:
   a control lever for multifunctional switch system coupled to a steering wheel in a motor vehicle and structured to be displaced into a plurality of different positions;
   a magnetic field generator fixed to the control lever, the magnetic field generator having first areas with a first magnetic direction and a second areas with a second magnetic direction and being movable into a plurality of different positions along a first and a second axes; and
   an integrated electronic device having a plurality of magnetic field detectors structured to detect the magnetic field from the magnetic field generator, the electronic device being structured to generate one or more control signals based on a position of the magnetic field generator indicated by its magnetic field.

32. A control device according to claim 31 wherein the electronic device further comprises:
   a code generator circuit coupled to receive a voltage from each of the detectors and structured to generate a code based on the voltages received from the detectors;
   a memory circuit structured to store a plurality of codes and associated commands, each stored code corresponding to a position of the control member; and
   a processing circuit coupled to the code generator circuit to receive the code and coupled to the memory circuit to access the codes and the associated commands stored in the memory circuit, the processing circuit being structured to compare the code received from the code generator circuit with the codes stored in the memory circuit and to select a command stored in the memory circuit based on the comparison, the processing circuit being structured to generate a control signal based on the command and to provide the control signal to a system external to the control device.

33. An apparatus, comprising:
   a first plurality of sensors distributed along a first line in a first plane;
   a second plurality of sensors distributed along a second line, perpendicular to the first line, in the first plane; and
   a magnetic facing the first plane and being movable into a plurality of different positions along a first and a second axes, and wherein the first and second pluralities of sensors are configured to detect the position on the magnet in the second plane with respect to the second and first lines respectively; and
   circuitry configured to receive data from the first and second pluralities of sensors and convert the data to a plurality of control signals.

34. The apparatus of claim 33 wherein the plurality of control signals are electrically coupled and configured to control a plurality of auxiliary functions of an automobile.

* * * * *

UNITED STATES PATENT AND TRADEMARK OFFICE
CERTIFICATE OF CORRECTION

PATENT NO.      : 6,529,140 B1
DATED           : March 4, 2003
INVENTOR(S)     : Herbert Sax et al.

It is certified that error appears in the above-identified patent and that said Letters Patent is hereby corrected as shown below:

Title page,
Item [73], Assignee, should read -- STMicroelectronics S.r.l. --.

Column 6,
Line 27, "to the first an wherein" should read as -- to the first plane, and wherein --.
Line 44, "of sensors" should read as -- a plurality of sensors --.

Column 7,
Line 8, "functions ba upon" should read as -- functions based upon --.

Signed and Sealed this

Ninth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,529,140 B1                                             Page 1 of 1
DATED          : March 4, 2003
INVENTOR(S)    : Herbert Sax et al.

It is certified that error appears in the above-identified patent and that said Letters Patent is hereby corrected as shown below:

Title page,
Item [73], Assignee, should read -- STMicroelectronics S.r.l. --.

Column 6,
Line 27, "to the first an wherein" should read as -- to the first plane, and wherein --.
Line 44, "of sensors" should read as -- a plurality of sensors --.

Column 7,
Line 8, "functions ba upon" should read as -- functions based upon --.

Signed and Sealed this

Twenty-third Day of December, 2003

JAMES E. ROGAN
*Director of the United States Patent and Trademark Office*